(12) United States Patent
Edelman et al.

(10) Patent No.: US 11,846,520 B2
(45) Date of Patent: Dec. 19, 2023

(54) METHOD AND DEVICE FOR DETERMINING A VEHICLE POSITION

(71) Applicant: Topcon Positioning Systems, Inc., Livermore, CA (US)

(72) Inventors: Leonid Valerianovich Edelman, Moscow (RU); Sergey Igorevitch Fedorenko, Saint Petersburg (RU); Dmitrii Alexandrovich Korchemkin, Kirov (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 222 days.

(21) Appl. No.: 17/276,470

(22) PCT Filed: Sep. 10, 2020

(86) PCT No.: PCT/RU2020/000477
§ 371 (c)(1),
(2) Date: Mar. 15, 2021

(87) PCT Pub. No.: WO2022/055382
PCT Pub. Date: Mar. 17, 2022

(65) Prior Publication Data
US 2022/0074757 A1  Mar. 10, 2022

(51) Int. Cl.
*G01C 21/36* (2006.01)
*G01C 21/34* (2006.01)
(Continued)

(52) U.S. Cl.
CPC ......... *G01C 21/3644* (2013.01); *B60W 30/18* (2013.01); *G01C 21/3476* (2013.01); *G06F 18/213* (2023.01); *G06V 20/56* (2022.01); *B60W 2420/42* (2013.01); *B60W 2420/52* (2013.01); *B60W 2554/4041* (2020.02)

(58) Field of Classification Search
None
See application file for complete search history.

(56) References Cited

U.S. PATENT DOCUMENTS 9,201,424 B1    12/2015  Ogale
11,313,684 B2 *  4/2022  Chiu ...................... G06V 20/10
(Continued)

OTHER PUBLICATIONS

International Search Report and Written Opinion dated May 27, 2021 in connection with International Patent Application No. PCT/RU2020/000477, filed Sep. 10, 2020, 7 pgs.

*Primary Examiner* — Peter D Nolan
*Assistant Examiner* — Michael F Whalen
(74) *Attorney, Agent, or Firm* — CHIESA, SHAHINIAN & GIANTOMASI PC

(57) ABSTRACT

The present disclosure describes a method and an apparatus for determining a corrected position of a vehicle based on a stable landmark. The method includes determining a last known position vector of the vehicle; capturing an image within a vicinity of a vehicle using an imaging device; identifying a stable landmark within the captured image based on a previously constructed reference map of the vicinity of the vehicle; determining a correction for a position of the vehicle based on the determined last known position vector of the vehicle and the identified stable landmark; and determining an updated position of the vehicle based on the determined correction.

15 Claims, 3 Drawing Sheets

(51) Int. Cl.
  *B60W 30/18* (2012.01)
  *G06V 20/56* (2022.01)
  *G06F 18/213* (2023.01)

(56) References Cited

U.S. PATENT DOCUMENTS

| | | |
|---|---|---|
| 2016/0236683 A1* | 8/2016 | Eggert .................... G08G 1/166 |
| 2017/0323179 A1 | 11/2017 | Vallespi-Gonzalez |
| 2018/0188060 A1 | 7/2018 | Wheeler et al. |
| 2018/0225968 A1 | 8/2018 | Wang |
| 2019/0146500 A1 | 5/2019 | Yalla et al. |
| 2020/0114509 A1* | 4/2020 | Lee ........................ G01S 15/931 |
| 2021/0397867 A1* | 12/2021 | Ge ......................... G06V 20/588 |
| 2022/0270358 A1* | 8/2022 | Cox ...................... G06V 10/811 |

* cited by examiner

METHOD AND DEVICE FOR DETERMINING A VEHICLE POSITION

TECHNICAL FIELD

The present invention relates generally to determining a vehicle position, and more specifically to accurate localization of a vehicle position based on a combination of a Global Navigation Satellite System (GNSS), an inertial measurement unit (IMU), and established stable landmarks.

BACKGROUND

As autonomous driving becomes an increasingly viable possibility, the tools and technology required for implementing fully or partially autonomous systems within vehicles must provide sufficiently accurate and useful data with which to process and execute various autonomous functions. A crucial aspect of an autonomous vehicle system is determining an accurate position of the vehicle within its environment at any given time. This not only allows a vehicle to accurately navigate from an origin point to a destination, it ensures the vehicle does not collide with nearby vehicles, pedestrians, infrastructure, and the like.

Autonomous driving systems require localization with sub-lane accuracy, which typically translates to decimeter level precision. In clear weather and open conditions, such as those found on a highway, this can be accomplished by using high-precision GNSS technology, including Real Time Kinematics (RTK) or Precise Point Positioning (PPP). However, in urban conditions with closely positioned buildings and various other dense infrastructure, GNSS often suffers from signal obstructions, multi-path propagation, and other negative effects. This hinders the ability of GNSS sensors to localize a vehicle with sufficient accuracy. A solution to this obstacle includes implementing additional positioning methods to augment the GNSS determined position in obstructed zones, including dead reckoning, integration of IMU measurements, visual odometry, simultaneous localization and mapping (SLAM) algorithms based on either camera or LIDAR measurements, map or point cloud matching, localization with respect to the features and/or landmarks, and combinations of the above.

These methods can be classified into two separate categories—inertial methods and map-based methods. Inertial methods include methods that implement IMUs, visual odometry, and SLAM algorithms. These are used to determine estimates of the vehicular position based on current sensor readings without any a priori knowledge about the current environment of the vehicle. A shortcoming of these approaches is the drift of the vehicle position estimate from its correct value when a GNSS signal is lost. This drift increases with the time or distance traveled from a last known correct position.

Map-based methods, which include map or point cloud matching and localization based on features or landmarks, use a priori knowledge about the environment, such as previously generated reference maps, to determine a vehicle position. This allows for compensation for the drift of the vehicle position estimate based on the known details of the surrounding environment. When coupled with a GNSS, the map-based method provides increased accuracy compared to inertial methods, as the position estimate is unrelated to the time or distance traveled from when an accurate GNSS signal becomes unavailable. In certain versions of the known map-based methods, a map of a particular area is first generated, e.g., based on prior captured images or point cloud data that is used to construct a reference map. Then, when a vehicle is navigating though that area and a GNSS signal cannot be accurately received, the vehicle captures current images from an on-board imaging device and the system attempts to match the captured images to the previously generated map to determine an accurate position of the vehicle.

However, current map-based methods are often inefficient and require analysis of multiple reference map possibilities to determine a best match, requiring both time and computing power that may not be readily available on a traveling vehicle. Therefore, an improved method of determining a vehicle position within urban conditions is desirable.

SUMMARY

The present disclosure provides a method for determining the position of a vehicle based on a combination of a last known position, stable landmarks, and a reference map of the current surroundings of the vehicle. In an embodiment, the reference map of the vicinity of a vehicle is predetermined and stable landmarks are identified and located within the map. To determine what qualifies as a stable landmark, multiple images of the area of interest are captured over a period of time, and the features that remain constant and non-changing are deemed to be stable.

Once a landmark is identified as stable, it may be used as a reference point within a map to determine the location of a vehicle coupled with a last known location. In an embodiment of the present disclosure, a position vector of the vehicle is determined, where the position vector represents the speed and direction in which the vehicle is traveling. In an urban setting, or a similar environment where it is difficult to determine the current position vector, the last known position vector is determined, and a correction for a current position is further determined based on the last known position vector and the stable landmark within the current vicinity of the vehicle.

Images of the vicinity of the vehicle are captured, e.g., by an on-vehicle camera, and are used to determine the current position of the vehicle. The captured images may include stable landmarks, and data indicating the direction of the camera to establish the position of the vehicle. In a further embodiment, an inertial measurement unit (IMU) is implemented to determine the position of the vehicle for a period of time after a position accuracy based on a GNSS signal falls below a threshold, extending the time a last known position is determined to be accurate. After the accuracy of data retrieved from the IMU falls below an IMU threshold, a correction of the vehicle position is calculated based on the reference map and captured images.

The aforementioned embodiments and other advantages of the embodiments described herein will be apparent to those of ordinary skill in the art at least by reference to this summary, the following detailed description, and the accompanying drawings.

DETAILED DESCRIPTION

Map-based methods can offer superior position estimations for autonomous driving applications compared to inertial methods when the accuracy of a position determination falls below a threshold for an extended period of time, since the time in which inertial methods remain effective can be quite limited. However, existing map-based methods suffer a number of challenges. Temporal variability of the environment and occlusions caused by other vehicles, temporary infrastructure, and the like, present obstacles in efficiently and accurately determining a match between a captured current image and a reference map. Landmarks such as road signs or traffic lights can disappear or be moved, lane markings can become worn out, the appearance or disappearance of leaves on trees, snow, dirt, temporary or semi-permanent traffic signage and the like can each significantly change the environment as perceived by an imaging device of an autonomous driving vehicle. The reference maps can quickly become outdated, and relying solely on an inaccurate map will lead to incorrect position determinations. The map matching or feature matching algorithms can fail due to these unknown changes, leaving the vehicle either without a position or with an incorrect position. Further, relying solely on the map-based methods can raise additional challenges, as shifting from a GNSS position directly to a map-based position without relying on a last known position requires a positive match of images to maps to occur within a short period of time, and often the speed of the vehicle makes such a quick match difficult, if not impossible, to be performed accurately while maintaining an accurate position estimation.

One embodiment of a method for determining a vehicle position involves creating reference maps with stable landmarks, and using the reference maps in conjunction with GNSS and IMU systems to determine an accurate current position of a vehicle. The disclosed method can be used when the accuracy of a current position of a vehicle that can be determined from a GNSS alone falls below a threshold.

The discussion below describes the generation of the reference maps that include stable landmarks. This may be performed on a vehicle other than the vehicle for which the position is being determined, as the reference maps require numerous images to be captured over an extended period of time to determine what qualifies as a stable landmark. The generated reference maps may then be stored for future access by a vehicle, e.g., for use during the method described in FIG. 2.

Figure 1:
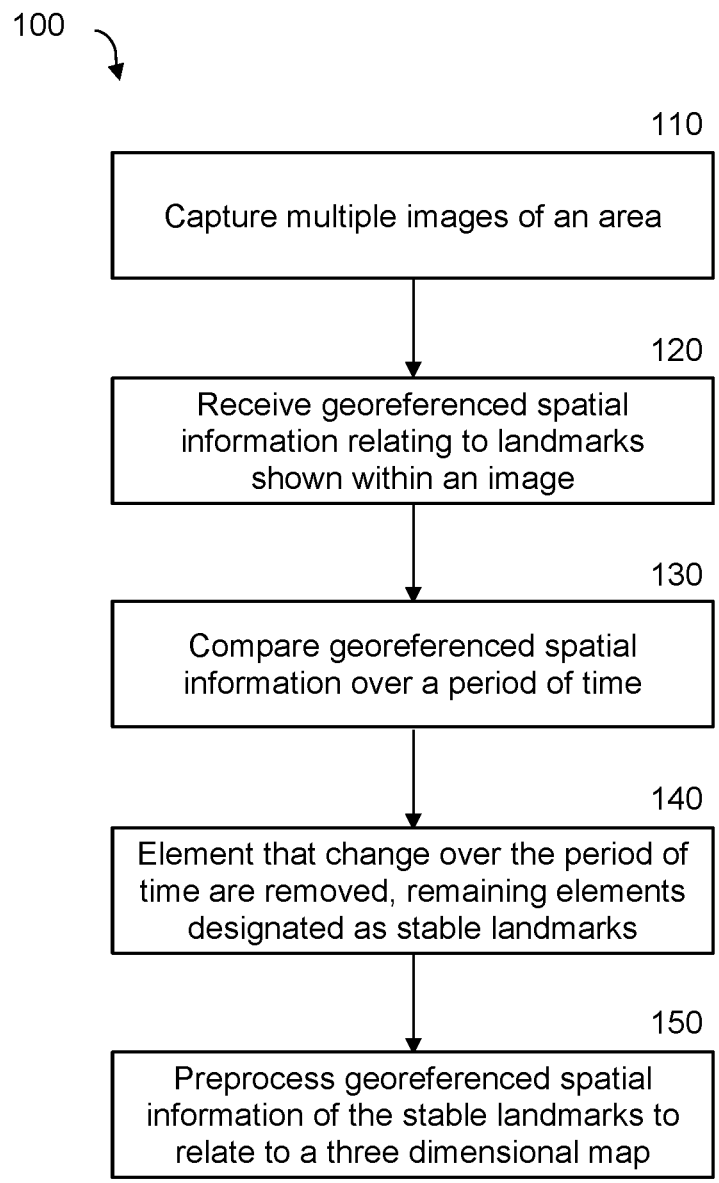
FIG. 1 is a flowchart of a method for identifying at least one stable landmark in accordance with an embodiment.

FIG. 1 is a flowchart of a method 100 for identifying at least one stable landmark in accordance with an embodiment.

At step 110, multiple images of various geographic areas are captured by an imaging device over a period of time. The imaging device may include a camera, a LIDAR sensor, and the like. For example, a vehicle equipped with one or more imaging devices navigates through the various geographic areas and captures images from multiple directions and vantage points of each area over a period of time. In an embodiment, the period of time is at least one year, allowing for the images to be captured through each of the seasons.

At step 120, georeferenced spatial information relating to one or more landmarks shown within the captured images is received. The georeferenced spatial information includes points of interest related to a landmark within the image that are associated with a physical location. This association can be performed manually or using automated tagging, e.g., via computer vision, machine learning, and the like. In an embodiment, the georeferenced spatial information is determined based on information gathered from LIDAR, from a mobile mapping system, or from collected images processed into 3D point clouds using photogrammetry.

At step 130, the georeferenced spatial information within images of the same area are compared over a period of time. For example, a first image of the area can be captured in the fall, a second image captured in the winter, a third image captured in the spring, and a fourth image captured in the summer. Various objects, elements, or points of interest will appear in some images but not in others. For example, leaves may appear on a tree in the spring and summer time, but may be absent in the fall or winter. Similarly, temporary traffic items, such as a detour sign or a traffic cone, may appear in the first image but not in the second, third, or fourth images. In contrast, a tree or lamppost, for example, may be consistently present in each image of the area.

At step 140, elements of the images that change over the period of time are removed from the georeferenced spatial information. The remaining elements are designated as stable landmarks. In an embodiment, only easily identifiable landmarks are designated as stable landmarks, e.g., a large rectangular building or a bridge, which allows for more efficient and faster identification.

At step 150, the georeferenced spatial information of the stable landmarks are preprocessed to relate the georeferenced spatial information to a three dimensional map. In an embodiment, the three dimensional map is previously generated without the stable landmarks. The preprocessing includes matching points of interest of the stable landmarks, such as corners, recognized shapes or colors, and the like, to known position coordinates within the three dimensional map. In an embodiment, the preprocessing of the georeferenced spatial information includes at least one of: volumetric structure creation; dense depth computation; and feature-point detection. Thus, the preprocessing includes associating the stable landmarks with known locations within the three dimensional map. The map is updated to include the stable landmarks, and may be used as a reference map to determine a vehicle position as discussed herein.

The map can include images, point cloud data, a combination of both, and the like. In an embodiment, the map further includes feature points associated with each stable landmark. The feature points may include feature descriptors that note points of interest for each stable landmark, such as a corner or a recognized shape, to allow matching an image captured by the vehicle to the map to be performed in an efficient manner.

Additionally, positioning information of the stable landmarks are embedded within the reference map. Thus, the map includes georeferenced spatial and imagery information, linking the stable landmarks with a set location with respect to an external standard, e.g., latitudinal and longitudinal coordinates, as well as with respect to the placement of the stable landmark within its surrounding environment, e.g., where the stable landmark is identified as being located between two or more other stable landmarks. The location of the stable landmarks are identified within a decimeter-level accuracy. A visual index may be constructed based on the reference map, where the index includes an association between the images and their location.

The reference maps and stable landmarks identified therein may be used by a travelling vehicle to determine a current position when the location determination based on a GNSS falls below a required threshold. In an embodiment, the reference map is saved in an accessible storage either remotely or onboard the vehicle, such that the map can be accessed by a localization apparatus of the vehicle when needed.

Figure 2:
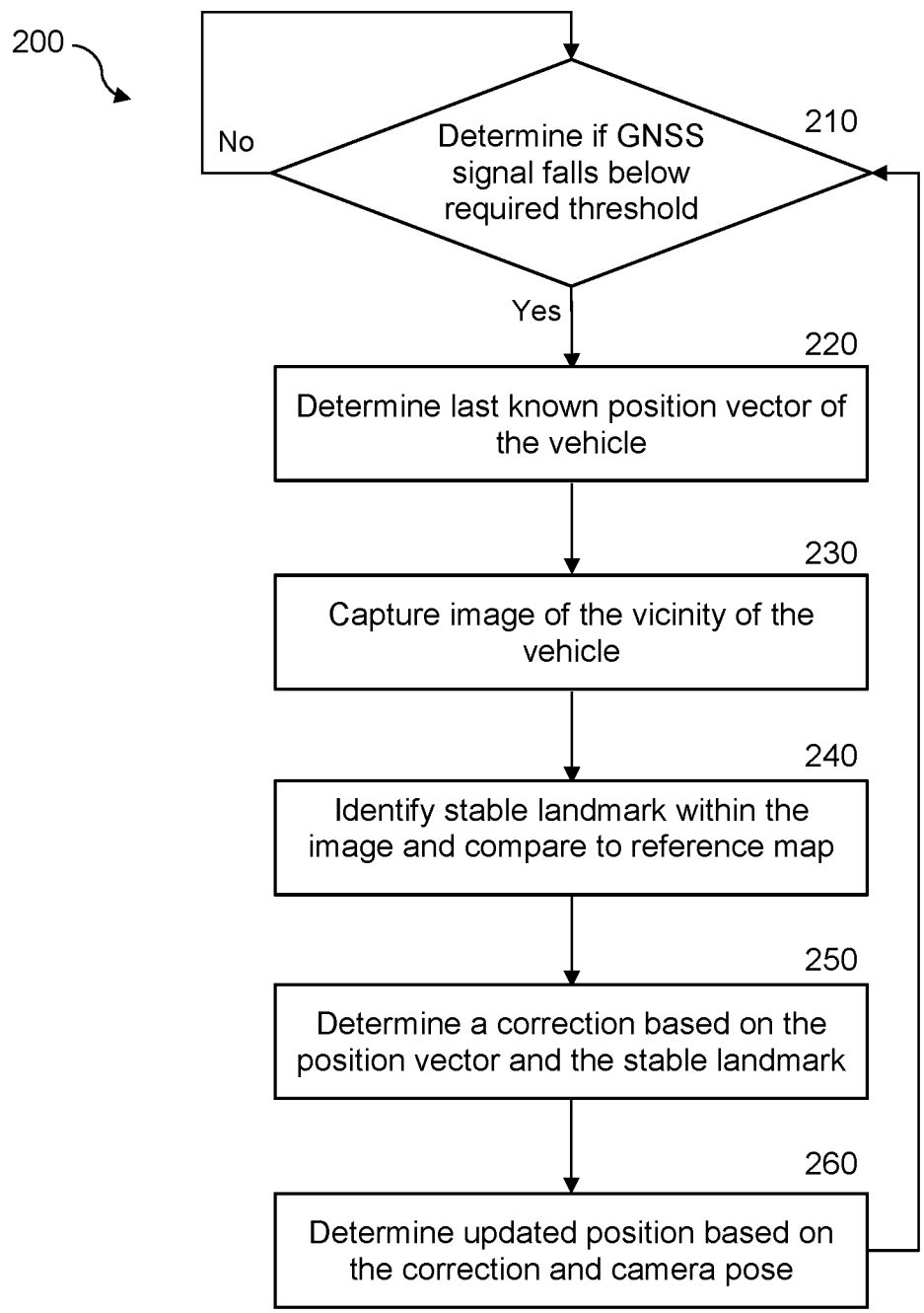
FIG. 2 is a flowchart of a method for determining a position of a vehicle in accordance with an embodiment.

FIG. 2 is a flowchart of a method 200 for determining a vehicle position when a vehicle is navigating through an area and the accuracy of a location determination based on a GNSS falls below a required threshold. Falling below, or crossing, the threshold may occur due to obstruction of the GNSS signals from infrastructure or objects within the area, multi-path propagation of the GNSS signals, weakening of received GNSS signals when the GNSS satellites used to for the location determination fall below the horizon, and the like. For example, GNSS often uses three or more satellite signals for determining position. If the signals from one or more of the satellites cannot be received or used by a GNSS receiver of the traveling vehicle, such as for the aforementioned reasons, the required threshold is crossed, and the GNSS becomes insufficient in providing an accurate location determination for the vehicle.

At step 210, it is determined if the accuracy of a location determination based on a GNSS falls below the required threshold. If so, the method continues at step 220, otherwise the method repeats the determination at step 210. In an embodiment, the required threshold is determined to be exceeded only after a set period of time. In yet a further embodiment, step 210 is an optional step, and the method 200 is performed continuously without regard to the strength or availability of a GNSS signal.

At step 220, a last known position vector of the vehicle is determined. A position vector includes the speed and direction at which the vehicle is traveling. The last known position vector is based on a last known speed, which may be determined directly from the vehicle or from a GNSS receiver, and a last known direction, which may be determined from an on-board compass. In an embodiment, the last known position vector is determined based on the last known position of the vehicle deemed to be sufficiently accurate, such as a position based on GNSS. In an embodiment, the last known position vector is coupled with a current vehicle speed to determine an estimated current position.

In an embodiment, in addition to the GNSS signal, the last known position vector of the vehicle may be further determined based on an inertial measurement unit (IMU). The determination of the last known position vector may be based solely on the GNSS, and an IMU is only employed after the required threshold is crossed.

In a further embodiment, the last known position vector is determined based solely on the IMU after the location determination based on the GNSS falls below the required threshold. The IMU may be used together with the vehicle's internal odometer to determine how far the vehicle has travelled since the threshold has been crossed. In yet a further embodiment, the IMU is configured to constantly determine data with the GNSS, and the last known position vector is always based on data from both the GNSS and the IMU.

The IMU provides sufficient accuracy for a limited period of time, e.g., accurate within 1 decimeter for 5 seconds or less after the threshold has been crossed. However, in an embodiment, a position vector is determined from the IMU even after the limited period of time, and an approximation of a vehicle position is determined in place of a last known position vector.

At step 230, one or more images of the vicinity in which the vehicle is traveling are captured, e.g., with an on-board imaging device such as a vehicle mounted camera. The vicinity may include a distance of a set radius around the vehicle, or the field of view as seen from an imaging device mounted onto the vehicle, e.g., the visible landscape ahead of or around the vehicle.

At step 240, a stable landmark within a vicinity of the vehicle is identified from the captured one or more images and compared to the reference map. A stable landmark is a feature that is identifiable within an image of a vehicle's environment that is determined to be permanent or semi-permanent such that it can be relied on as a point of reference.

In an embodiment, the stable landmark is identified based on a previously constructed reference map of the vicinity of the vehicle, where the reference map includes one or more stable landmarks that are determined to be reliable as a point of reference, e.g., the reference map discussed in FIG. 1. The reference map may be stored locally within the vehicle, or remotely, e.g., on an external or cloud-based server accessible from the vehicle. The stable landmark of the reference map is matched to the identified stable landmark of the captured image using computer vision, machine learning, scale-invariant feature transform (SIFT) feature detection algorithm, and the like.

At step 250, a correction is determined based on the last known position vector and the identified stable landmark. The correction may be represented as follows: the previously constructed reference map is defined as M. An estimate of the last known position vector X at time t is known, and an image I from an on-board imaging device is captured. A correction x' to the last known position vector X which maximizes the likelihood of similarity between f(t) and a projection of M onto a virtual camera located at X+x' is determined. The correction is determined using known optimization algorithms, such as least squares adjustment, random sample consensus (RANSAC), and the like.

In an embodiment, a virtual camera is placed at X+x' to construct an image of the vicinity of the vehicle at the corrected position such that the constructed artificial image is most similar to the real image captured by real camera. If a correction x' is found, the position is determined to be known with high accuracy and the correction is applied to the last known position vector. If a correction is not found, or if the likelihood of similarity falls below a threshold, the image I is discarded. In such a case, the position estimate may be extended based solely on the IMU without a correction x', and the next image is processed.

In an embodiment, a plurality of visually similar image frames are retrieved from a database using a visual index, wherein each of the plurality of visually similar image frames depicts a scene within the vicinity of the vehicle. The visual index is association with the previously constructed reference map, where the visually similar images are associated with a location within the reference map. The plurality of visually similar image frames are used to estimate a camera position and determine the correction x'.

As an example, the visually similar image frames are previously collected, as presented in the method discussed in FIG. 1. The images may captured from a road at a set interval, e.g., every meter, and from every lane of that road. Thus, the visual index contains multiple images of a scene from multiple perspectives. The determination of the correction involves matching a currently captured image with an image within the visual index that is most similar to the currently captured image. Such a match is performed using imaging matching algorithms.

The estimate of the camera position with respect to a specific reference image may be based on feature matching, which results in a set of 2D-3D correspondences represented by $x_i \leftrightarrow X_i$ ($x_i \in R^2$, $X_i \in R^3$). Using a minimal solver and RANSAC, the position of a query image $\omega_q$ is estimated with a set of inliers such that reprojection error is represented by the following $$\|\pi((\omega_c^{-1} \circ \omega_q^{-1} \circ \omega_r) \cdot X_i) - x_i\|^2,$$

where the reprojection error is sufficiently small, e.g., below an error threshold, and $\omega_r$ is the position of the reference image stored in the map. $\pi$ denotes the camera projection and $\omega_c$ denotes the position of the camera relative to the vehicle. If a sufficiently robust estimation is determined, the sum of reprojection errors for all inliers can be optimized by $\omega_q$.

In a further embodiment, inlier sets and position estimates from different reference images are aggregated and one more optimization of a sum of all reprojection errors is performed.

At step 260, an updated position is determined based on the correction. In an embodiment, the updated position includes an adjustment in position location, e.g., an updated set of GPS coordinates. In a further embodiment, the updated position additionally includes an adjustment to the velocity of the vehicle.

Figure 3:
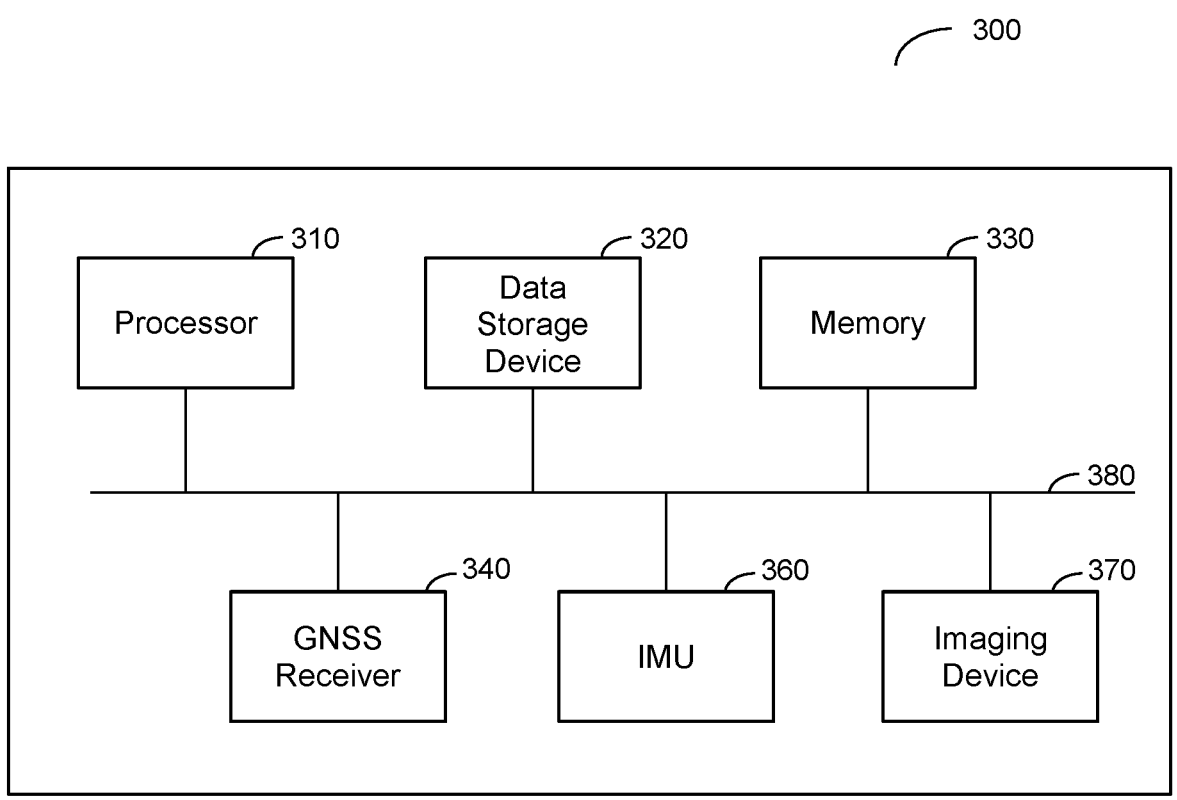
FIG. 3 is a block diagram of an apparatus in accordance with an embodiment.

FIG. 3 is a block diagram of an apparatus 300 in accordance with the embodiments of the present disclosure. In an embodiment, the apparatus 300 can be implemented as a localization apparatus for use in a vehicle for determining a current location as described in conjunction with FIG. 2. In a further embodiment, the apparatus 300 can be implemented as a collection apparatus for use in a vehicle used to collect images for construction of the reference map as discussed in conjunction with FIG. 1.

The apparatus 300 comprises a processor 310 operatively coupled to a data storage device 320 and a memory 330. The processor 310 controls the overall operation of apparatus 300 by executing computer program instructions that define such operations. The computer program instructions may be stored in data storage device 320, or other computer readable mediums, and loaded into memory 330 when execution of the computer program instructions is desired. Thus, at least the method steps of FIGS. 1-3 can be defined by the computer program instructions stored in memory 330 and/or data storage device 320 and controlled by processor 310 executing the computer program instructions. For example, the computer program instructions can be implemented as computer executable code programmed by one skilled in the art to perform at least the algorithms defined by the method steps of FIGS. 1-2.

The apparatus 300 also includes one or more network interfaces for communicating with other devices via a network (not shown). The apparatus 300 further includes a GNSS receiver 340 configured to receive signals from a positioning satellite system, and an optional IMU 360 configured to determine the inertial measurements, such as the acceleration, angular rate, orientation, and the like, of a vehicle in which the apparatus 300 is installed. The apparatus 300 may further include an imaging device 370, such as a camera or a LIDAR sensor, configured to capture still images, video, or both of an environment of the vehicle within a set vicinity. The various elements of apparatus 300 are connected to each other via a bus 380.

The processor 310 may include both general and special purpose microprocessors, and may be the sole processor or one of multiple processors of apparatus 300. The processor 310 may comprise one or more central processing units (CPUs), for example. The processor 310, data storage device 320, and/or memory 330 may include, be supplemented by, or incorporated in, one or more application-specific integrated circuits (ASICs) and/or one or more field programmable gate arrays (FPGAs).

The data storage device 320 and memory 330 each comprise a tangible non-transitory computer readable storage medium. The data storage device 320, and memory 330, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

One skilled in the art will readily recognize that any implementation of an actual computer, computer system, or computing device may have other structures and may contain other components, and that apparatus 300 is merely a high level representation of some of the components for illustrative purposes.

All systems and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

All systems and methods described herein may also be implemented using computers operating in a client-server relationship. Typically, in such a system, the client computer is located remotely from the server computer and interaction takes place via a network. The client-server relationship may be defined and controlled by computer programs executing on their respective client and server computers. In the current disclosure, the vehicle may be equipped with a stand-alone network connection, or may rely on accessing external data through a secondary device, such as a cellular phone.

All systems and methods described herein may be implemented using a computer program product tangibly embodied in an information carrier, e.g., in a non-transitory machine-readable storage, for execution by a programmable processor; and the method steps described herein may be implemented using one or more computer programs executable by such processor. A computer program may be a set of computer program instructions that can be used, directly or indirectly, by a computer to perform a certain activity or bring about a certain result. A computer program may be written in any form of programming language, including compiled or interpreted languages, and may be deployed in any form, including as a stand-alone program or as a module, component, subroutine, or other unit suitable for use in a computing environment.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for determining a position of a vehicle, comprising:
   determining a last known position vector of the vehicle;
   capturing an image within a vicinity of the vehicle using an imaging device;
   identifying a stable landmark within the captured image based on a previously constructed reference map of the vicinity of the vehicle, wherein the previously constructed reference map is based on georeferenced spatial information captured over a period of time, wherein the stable landmarks are elements that do not change over the period of time;
   determining a correction for a position of the vehicle based on the last known position vector and the stable landmark, wherein determining the correction for the position of the vehicle further comprises:
      matching the captured image with an image within a visual index that is most similar to the captured image, wherein matching the captured image is based on feature matching and minimizing reprojection error
   wherein the reprojection error is represented by:

$$\|\pi((\omega_c^{-1} \circ \omega_q^{-1} \circ \omega_r) \cdot X_i) - x_i\|^2,$$

where $\pi$ denotes a projection of the imaging device, $\omega_c$ denotes a position of the imaging device relative to the vehicle, $\omega_q$ is a position of a query image, $\omega_r$ is a position of a reference image stored in the reference map, $X_i$ is the last known position vector, and $x_i$ is the correction; and
   determining an updated position of the vehicle based on the determined correction.

2. The method of claim 1, wherein determining the correction for a position of the vehicle is performed when a position accuracy of a location determination of the vehicle based on a navigation satellite system (GNSS) falls below a required threshold.

3. The method of claim 1, wherein the last known position vector of the vehicle is determined at least in part based on an inertial measurement unit (IMU).

4. The method of claim 3, wherein determining the correction for a position of the vehicle is performed when an accuracy of data retrieved from the IMU falls below a threshold.

5. The method of claim 1, wherein the imaging device includes at least one of a camera and a LIDAR sensor.

6. An apparatus comprising:
   a global navigation satellite system (GNSS) receiver configured to determine a position of the apparatus;
   an imaging device;
   a processor; and
   a memory to store computer program instructions for determining a position of a vehicle, the computer program instructions when executed on the processor cause the processor to perform operations comprising:
      determining a last known position vector of the vehicle based on the GNSS receiver;
      capturing an image within a vicinity of a vehicle using the imaging device;
      identifying a stable landmark within the captured image based on a previously constructed reference map of the vicinity of the vehicle, wherein the previously constructed reference map is based on georeferenced spatial information captured over a period of time, wherein the stable landmarks are elements that do not change over the period of time;
      determining a correction for a position of the vehicle based on the determined last known position vector of the vehicle and the identified stable landmark, wherein determining the correction for a position of the vehicle further comprises:
         matching the captured image with an image within a visual index that is most similar to the captured image, wherein matching the captured image is based on feature matching and minimizing reprojection error
      wherein the reprojection error is represented by the following:

$$\|\pi((\omega_c^{-1} \circ \omega_q^{-1} \circ \omega_r) \cdot X_i) - x_i\|^2,$$

where $\pi$ denotes a projection of the imaging device, $\omega_c$ denotes a position of the imaging device relative to the vehicle, $\omega_q$ is a position of a query image, $\omega_r$ is a position of a reference image stored in the reference map, $X_i$ is the last known position vector, and $x_i$ is the correction; and
      determining an updated position of the vehicle based on the determined correction.

7. The apparatus of claim 6, wherein determining the correction for a position of the vehicle is performed when a position accuracy of a location determination of the vehicle based on a navigation satellite system (GNSS) falls below a required threshold.

8. The apparatus of claim 6, wherein the last known position vector of the vehicle is determined at least in part based on an inertial measurement unit (IMU).

9. The apparatus of claim 8, wherein determining the correction for a position of the vehicle is performed when an accuracy of data retrieved from the IMU falls below a threshold.

10. The apparatus of claim 6, wherein the imaging device includes at least one of a camera and a LIDAR sensor.

11. A non-transitory computer readable medium storing computer program instructions for determining a position of a vehicle, which, when executed on a processor, cause the processor to perform operations comprising:
    determining a last known position vector of the vehicle;
    capturing an image within a vicinity of a vehicle using an imaging device;
    identifying a stable landmark within the captured image based on a previously constructed reference map of the vicinity of the vehicle, wherein the previously constructed reference map is based on georeferenced spatial information captured over a period of time, wherein the stable landmarks are elements that do not change over the period of time;
    determining a correction for a position of the vehicle based on the last known position vector and the stable landmark, wherein determining the correction for a position of the vehicle further comprises:
       matching the captured image with an image within a visual index that is most similar to the captured image, wherein matching the captured image is based on feature matching and minimizing reprojection error wherein the reprojection error is represented by the following:

$$\|\pi((\omega_c^{-1} \circ \omega_q^{-1} \circ \omega_r) \cdot X_i) - x_i\|^2,$$

where $\pi$ denotes a projection of the imaging device, $\omega_c$ denotes a position of the imaging device relative to the vehicle, $\omega_q$ is a position of a query image, $\omega_r$ is a position of a reference image stored in the reference map, $X_i$ is the last known position vector, and $x_i$ is the correction; and determining an updated position of the vehicle based on the determined correction.

12. The non-transitory computer readable medium of claim 11, wherein determining the correction for a position of the vehicle is performed when a position accuracy of a location determination of the vehicle based on a navigation satellite system (GNSS) falls below a required threshold.

13. The non-transitory computer readable medium of claim 11, wherein the last known position vector of the vehicle is determined at least in part based on an inertial measurement unit (IMU).

14. The non-transitory computer readable medium of claim 13, wherein determining the correction for a position of the vehicle is performed when an accuracy of data retrieved from the IMU falls below a threshold.

15. The non-transitory computer readable medium of claim 11, wherein the imaging device includes at least one of a camera and a LIDAR sensor.

\* \* \* \* \*